US005749961A

United States Patent [19]

Jaklin

[11] Patent Number: 5,749,961
[45] Date of Patent: *May 12, 1998

[54] CONCRETE OR MORTAR RESISTANT TO SPALLING UNDER FIRE ATTACK

[76] Inventor: Hans Jaklin, Erlenhof, Aacherweg 15, D-5000 Trier, Germany

[*] Notice: The term of this patent shall not extend beyond the expiration date of Pat. No. 5,472,497.

[21] Appl. No.: 838,828

[22] Filed: Apr. 10, 1997

Related U.S. Application Data

[60] Continuation of Ser. No. 519,746, Aug. 28, 1995, abandoned, which is a division of Ser. No. 79,266, Jun. 21, 1993, Pat. No. 5,472,497.

[30] Foreign Application Priority Data

Jun. 20, 1992 [DE] Germany ............... 42 20 274.4

[51] Int. Cl.$^6$ ..................... C04B 28/00
[52] U.S. Cl. ............. 106/672; 106/711; 106/737; 106/724; 252/604
[58] Field of Search ............... 106/15.05, 677, 106/711, 737, 802, 808, 724, 727, 672; 252/601, 604

[56] References Cited

U.S. PATENT DOCUMENTS

| | | | |
|---|---|---|---|
| 3,933,515 | 1/1976 | Yang . | |
| 3,948,673 | 4/1976 | Chase et al. | 106/711 |
| 4,015,994 | 4/1977 | Hill | 106/711 |
| 4,115,135 | 9/1978 | Goeman | 106/711 X |
| 4,689,084 | 8/1987 | Ambroise et al. | 106/711 |
| 4,755,228 | 7/1988 | Sakurai et al. | 106/711 X |
| 4,964,913 | 10/1990 | Takada et al. | 106/808 |
| 5,108,679 | 4/1992 | Rirsch et al. | 106/711 X |
| 5,256,349 | 10/1993 | Sato et al. | 106/711 X |

FOREIGN PATENT DOCUMENTS

| | | |
|---|---|---|
| 0 347 092 A2 | 12/1989 | European Pat. Off. . |
| 0 441 296 A1 | 8/1991 | European Pat. Off. . |
| 2518082 A | 6/1983 | France . |
| 353 032 | 5/1922 | Germany . |
| 39 08 782 A1 | 9/1990 | Germany . |
| 39 26 123 A1 | 2/1991 | Germany . |
| 40 03 382 A1 | 8/1991 | Germany . |
| 460 118 B | 9/1989 | Sweden . |
| 2170234 | 7/1986 | United Kingdom . |

OTHER PUBLICATIONS

Derwent Publications, Inc., Abstract AN-89-059523, Reinforcing concrete using steel fibres--using fibres mixed in wet concrete with thin plastic fibres preventing sedimenting, Week 8908 (1989) (Abstract of Swedish Patent Publication SE 460 118 (A), based on Swedish Patent Application No. 8701395-9).

Chemical Abstracts, vol. 103, No. 22, Abstact No. 182730p, Dec. 02, 1985, Effect of silica fume and water-reducing agent on properties of polyamide fiber reinforced cement (Abstract of Ohama, Y., et al., Proc. Jpn. Congr. Mater. Res. 1985, 28th, 145-150 (Eng.)).

Chemical Abstracts, vol. 108, No. 18, Abstract No. 155513s, May 02, 1988, Organic Fiber-reinforced cement products for building materials (Abstract of Kondo, J. et al., Jpn. Published Patent Application No. JP 62,270,472 (87,270, 472).

*Primary Examiner*—Karl Group
*Attorney, Agent, or Firm*—Vorys, Sater, Seymour & Pease, LLP

[57] ABSTRACT

Reinforced concrete members consisting of a high-strength concrete are subject to explosive spalling. Such spalling can be prevented by the introduction of a capillary system into the concrete of such members, containing substantially linear capillaries having a diameter of at least 3 μm and a length of at least 5 mm. This capillary system can be built during or after the hardening of the concrete without impairing the other desired properties of the concrete or mortar, or it can first be produced under the fire attack. This can be effected with fibers which form the capillaries by dissolution, softening, decomposition, shrinkage or melting and which, due to their shape, i.e. diameter and length, and the incorporated amount, correspond to the desired capillaries.

12 Claims, No Drawings

CONCRETE OR MORTAR RESISTANT TO SPALLING UNDER FIRE ATTACK

This application is a continuation of application Ser. No. 08/519,746 filed on Aug. 28, 1995, now abandoned, which is a divisional of application Ser. No. 08/079,266, filed Jun. 21, 1993, now U.S. Pat. No. 5,472,497.

BACKGROUND OF THE INVENTION

Concretes of standard DIN 1045, Eurocode 2, ACI 318–89, are distinguished by their bulk density: lightweight concrete, normal weight concrete and heavy weight concrete. These concretes are substantially manufactured from binders—in general cement of standard DIN 1164 or comparable standards—aggregate, which meets the requirements of DIN 4226 (part 1–3) and water. Concrete admixtures and additives are usually additionally used. The first mentioned substances change the characteristics of the concrete by chemical and/or physical action, e.g. solidification, workability or setting. In contrast, additives are finely-distributed additional substances which influence specific concrete properties and in contrast to the concrete admixtures have to be taken into consideration as parts by volume when calculating the mixing ratios, e.g. latent hydraulic substances or pigments, which can also be of organic origin.

Prefabricated members and buildings made of concrete—reinforced concrete members or prestressed concrete members—must meet a number of requirements in respect of bearing capacity and stability under load. The pertinant standards (inter alia DIN 1045 and DIN 4227, Eurocode 2, etc) and the building regulations of the land have to be taken into account in design and manufacturing the same.

Prefabricated concrete members and concrete buildings must also meet a number of requirements in respect of fire safety. In this connection, the building regulations of the land and, in particular, the standards DIN 4102 (Eurocode 2, etc) are decisive.

The stability of the concrete is impaired under fire attack and the prefabricated parts exhibit failures after being exposed to fire for a specific period of time. According to the concrete-fire protection handbook by K. Kordina and C. Meyer-Ottens, Betonverlag GmbH, Düsseldorf 1981, pages 152 to 167, in particular the following kinds of failures are observed in reinforced concrete members under fire: failure of the tension zone, failure due to thrust or torsional breakage, failure of the compression zone, failure by exceeding the admissible raise of temperature at the non fire-exposed surface and failure due to spalling.

Destructive spalling in prefabricated concrete members of normal strength could be counteracted by an appropriate selection of the dimensions, the cross-sectional shapes, the mechanical stress distribution and the arrangement of the reinforcement, in connection with their long-term drying in the building.

Practical experience and material tests show that until now, explosion spalling of prefabricated high-strength concrete members have always occured under fire exposure. The term high-strength concretes includes those, which, with respect to their strength, are superior to the highest strength class B 55, embraced by the standards DIN 1045, Eurocode 2 ACI 318–89 etc, e.g. a B 85. In order to obtain the high strength of the cement stone, high-strength concretes are made with very low water/cement ratios generally below 0.40. Concretes are impermeable to liquid water and their diffusion of water vapor takes place very slowly, such that the concrete—even after hundreds of year storage at ambient conditions—usually contains more than 3 weight-% water. This means that prefabricated members made of a high-strength concrete can never dry out under normal ambient conditions ($\leq 2\%$ by weight).

Due to the prevailing high moisture content and the high diffusion resistance vis à vis water vapor, very high pressures necessarily result inside the high-strength prefabricated concrete members under fire, which finally lead to explosive spalling, in particular when the concrete is simultaneously subjected to high mechanical stress.

Spalling under fire has generally been observed in prefabricated members whose inherent moisture and impermeability exceed certain limits, for example $\geq 2\%$ in normal strength concrete. Spalling also occurs in prefabricated parts of shotcrete (according to the standard DIN 18551) or in centrifugal concrete, light-weight concrete with closed structure and shot mortar.

For this reason, very narrow limits are set to the use of these building materials, in particular of high-strength concrete, or very expensive technical measures, such as an outer network reinforcement for preventing the falling off of the detached or spalled concrete core or expensive insulations against the fast penetration of heat in the case of fire are necessary. Also the addition of steel fibers to increase the tensile strength of the concrete did not lead to the desired success.

SUMMARY OF THE INVENTION

The object of the invention is to prevent the destructive spalling under fire in prefabricated members of dense concrete or mortar.

This is achieved by the present invention by providing prefabricated parts of dense concrete or mortar, such as construction concrete according to standard DIN 1045, in particular high-strength concretes, construction lightweight concrete with closed structure, shotcrete, centrifugal concrete or shot mortar with a linear capillary system. These capillaries have preferably a circular cross section and a diameter of from 3 to 350 μm, in particular 10 to 100 μm. Lengths of up to 35 mm, in particular up to 20 mm, are usually sufficient. The capillaries ought to be about 0.05 to 1 vol. %, preferably 0.1 to 0.3 vol. % of the concrete or mortar.

DETAILED DESCRIPTION OF THE INVENTION EMBODIMENTS

Without impairing the other desired properties of the concrete or mortar, this capillary pore system can be provided in the course of time, e.g. during or after the hardening of the concrete, or it can first be produced under the fire attack. This can be effected with fibers which form the capillaries by dissolution, softening, decomposition, shrinkage or melting and which correspond with respect to their shape, i.e. diameter and length, as well as the incorporated amount, to the desired capillaries. The fibers can be of organic or inorganic nature. They need not consist of one and the same material, but, advantageously for the strength of the produced concrete, it can also be a core-shell fiber, with a shell of glass or metal or carbon fiber. The core fibers are usually individual fibers. They have a coating (shell) of the same material to be removed at the latest during fire by dissolution, softening, shrinkage, displacement or melting so that the capillary is normally annular and also contains the carbon, metal or glass fibers centrically. Other cross-sectional shapes of the capillaries and fibers are also possible. Also in these cases, as in the case of capillaries with free cross section, the water in the concrete, physically bonded and partially also chemically bonded can flow out on time when a fire occurs so that extreme water vapor pressure leading to the familiar spalling cannot be formed. Thus, the limits for the use of high-strength concrete, lightweight concrete, shotcrete shot mortar, which until now seemed to be insuperable, are abrogated by the invention.

An inorganic fiber which dissolves in the course of time may consist, for example of glass of low resistance to alkaline solutions, e.g. alkaline solution resistance of class 3 according to standard DIN 52322, which can be attacked and dissolved by the soda alkaline liquid of the pores of the hardened cement paste with a pH value of up to 12.6. The same applies to organic fibers, in particular of polyester, which are progressively saponified under these conditions. Glasses and polymers of the kind come into question both for the fibers as such and for the shell of the mentioned core-shell fibers.

Organic fibers which can produce the desired capillaries in the case of fire consist of a material which softens, shrinks, melts or is decomposed at temperatures of not lower than 100° C., in particular at temperatures of not lower than 150° to 300° C. Examples thereof are natural fibers, such as wool or silk, in particular their waste or synthetic fibers, preferably polyamides or polyolefins, such as polyethylene or polypropylene. Also the shell of core-shell fibers can consist of these materials.

Suitable fibers for the purposes of the invention have a diameter of preferably 3 to 350 µm, in particular 10 to 100 µm. The length of the fibers is advantageously 5 to 35 mm, in particular 8 to 20 mm. The fiber content is about 0.5 to 10, preferably 1 to 5 kg/m$^3$ concrete, or 0.05 to 1, preferably 0.1 to 0.3 vol. % of the concrete.

If, beside the fibers, 2 to 6% by weight, based on the cement component, finely divided amorphous silicic acid having at least 90% by weight SiO$_2$ or a finely dispersed precipitated active silicate of magnesium, calcium, barium or aluminum having a BET surface area of 50 to 200 m$^2$/g and a d$_{50\%}$ value of below 20 µm is additionally added to the concrete or mortar mixture, the spalling during fire is reduced, surprisingly enough, to up to zero spalling.

This result is unexpected because it is known that the dosage of active silicic acid or active silicates of the mentioned metal ions make the concrete more impermeable to the penetration of liquids and gases. The reasons for the improvement of the properties of the concrete also under fire are hardly known and cannot be exactly explained.

The improvement of the fire characteristics by the finely dispersed silicic acid and/or the silicates—due to interaction with the fibers—can be ascribed with some probability to the homogenization of the concrete micro-structure.

Also the designed use of the described concretes or mortars with synthetically produced micropores, or with micropores that are first produced upon fire exposure, which are manufactured without or with simultaneous addition of finely dispersed silicic acids and/or silicates, to prevent the destructive spalling in the case of fire, in particular over the steel reinforcement, is subject matter of this invention.

EXAMPLE

Three concrete mixtures were manufactured according to the following table, on the basis of Portland cement 55 F, sand, gravel and crushed basalt.

| Mix proportion | | I | II | III |
|---|---|---|---|---|
| cement (PZ 55-F) | kg/m$^3$ | 460 | 460 | 465 |
| silica fume slurry (70 kg slurry = 35 kg of silicic acid) | kg/m$^3$ | 70 | 70 | — |
| precipitated finely dispersed silicic acid (BAGRAT KS 300) | kg/m$^3$ | — | — | 14.0 |
| sand 0/2 mm | kg/m$^3$ | 735 | 735 | 745 |
| gravel 2/8 mm | kg/m$^3$ | 205 | 205 | 205 |
| crushed basalt 8/16 mm | kg/m$^3$ | 880 | 880 | 890 |
| water | l/m$^3$ | 153 | 153 | 145 |
| super-plasticizer (FM72 Sicotan) | kg/m$^3$ | 27.6 | 27.6 | 28.0 |
| polypropylene fibers (ø 100 µm, l = 12 mm) melting interval 160–170° C. | kg/m$^3$ | 4.0 | — | 4.0 |
| water/cement + 2 × silica fume | | 0.35 | 0.35 | 0.35 |

For the fire tests, three short columns (25×25×100 cm$^3$; reinforced with eight steel bars ø 18 mm; stirrups =ø 8 cm, e=15 cm; concrete cover nom C$_B$=2.5 cm) as well as six cubes were made, moist cured for 28 days and subsequently stored at about 65% relative moisture and 20° C. until testing.

The tested cubes yielded strengths between 90 N/mm$^2$ and 105 N/mm$^2$.

A total number of four three months-old columns were fire tested with the following loads in conformity with the standard temperature curve (ISO-standard fire curve, ISO 834) DIN 4102, part 2, edition 09/77:

specimen 1, mix III, centric load with 2000 kN specimen 2, mix I, centric load with 2000 kN specimen 3, mix II, centric load with 2000 kN specimen 4, mix III, excentric load (e=d/6.25) with 1200 kN.

Specimen 1, mix III, i.e. with the addition of precipitated, finely-dispersed silicic acid and the polypropylene fibers; and specimen 2, consisting of mix I, with silica fume and the polypropylene fibers resisted the two hours fire exposure without showing any major deformations, cracks or collapsing of the longitudinal reinforcing steels. Specimen 1 did not show any spalling. Specimen 2 exhibited between the 6th and 15th minute minor spalling at its smoothed top surface which, however, were only about 5 mm in depth.

Starting from the 6th minute, serious spallings occured in sample 3, mix II, which was identical to mix I, except for the missing addition of the polypropylene fibers, which also resulted in an exposure of stirrups and longitudinal rods; thereupon, the test was terminated after 45 minutes.

Specimen 4, made of mix III, did not show any spalling even under excentric load which was increased after 65 minutes to the maximum possible load which could be achieved by the testing machine. The test had to be interrupted due to overheating of the test frame.

The test programm was conducted with the determination of the residual bearing capacity of specimen 1, 2, and 4, around 14 days after the pertinent fire experiments. The residual capacities determined were:

specimen 1: 2740 kN (centric load)

specimen 2: 2900 kN (centric load)

specimen 4: 1720 kN (excentric load)

The short columns made of mix I and III did not exhibit any spalling although their concrete moisture, analogous to the column of mix II—measured by means of simultaneously manufactured and stored cubes—was between 4.2 and 4.4 mass % of the concrete. As to the columns made of fiber concrete, if desired with the addition of the finely-despersed silicic acid, a classification under fire-resistant class F 120-A was possible without reservation. Probably the columns can be classified under fire-resistant class F 180-A. This classification failed only because the test had to be interrupted due to overheating of the test frame.

I claim:

1. A prefabricated member or part of high strength concrete resistant to spalling under fire attack characterized in that it comprises cement and auxiliary ingredients, said auxiliary ingredients comprising 2 to 6% by weight, based on the weight of said cement, of a finely divided precipitated silicic acid having at least 90% by weight $SiO_2$ or a finely divided precipitated active silicate of magnesium, calcium, barium or aluminum having a BET surface area of from 50 to 200 $m^2/g$ and a $d_{5)\%}$ value of below 20 µm; and fibers in a concentration of from 0.1 to 0.3 volume percent of the concrete, said fibers being capable of forming capillary pores having a diameter of between 10 µm and 100 µm and a length of between 5 mm and 35 mm.

2. A prefabricated member or part according to claim 1, characterized in that the capillary pores are formed by dissolution, softening, decomposition, shrinkage, or melting.

3. A prefabricated member or part according to claim 2, characterized in that the fibers are decomposable by alkali.

4. A prefabricated member or part according to claim 2, characterized in that the fibers soften, melt shrink or are decomposed at temperatures of not below 100° C.

5. A prefabricated member or part according to claim 1, characterized in that the fibers are organic fibers.

6. A prefabricated member or part according to claim 5, characterized in that the organic fibers consist of polyolefins, polyamides or polyesters.

7. A prefabricated member or part according to claim 1, characterized in that the fibers are core-shell fibers having a core of high melting individual fibers and a coating which can be removed by dissolution, softening, decomposition, shrinkage or melting.

8. A prefabricated member or part according to claim 7, characterized in that the coating softens, melts, shrinks or is decomposed at a temperature higher than 100° C.

9. A prefabricated member or part according to claim 7, characterized in that the core of the fiber is a glass, metal or carbon fiber.

10. A prefabricated member or part according to claim 2, characterized in that the fibers soften, melt, shrink or are decomposed within a temperature range of 150° to 300° C.

11. A prefabricated member or part according to claim 8, characterized in that the coating softens, melts, shrinks or is decomposed at a temperature higher than 200° C.

12. A prefabricated member or part according to claim 1, characterized in that the fibers have a length of from 8 to 20 mm.

* * * * *